United States Patent Office 3,436,266
Patented Apr. 1, 1969

3,436,266
METHOD OF TREATING STORAGE
BATTERY PLATES
Herbert Haebler, Frankfurt am Main, Germany, assignor to Varta Aktiengesellschaft, Frankfurt am Main, Germany
No Drawing. Continuation-in-part of application Ser. No. 630,170, Mar. 20, 1967. This application Oct. 30, 1967, Ser. No. 679,241
Claims priority, application Germany, Nov. 2, 1966, V 32,245
Int. Cl. H01m 35/02, 39/00
U.S. Cl. 136—27                    10 Claims

ABSTRACT OF THE DISCLOSURE

Storage battery plates and particularly the negative plates of lead-acid storage batteries are impregnated with boric acid by filling a container such as a battery housing, in which the battery plates are located in formed condition, with an aqueous solution of boric acid, and subjecting the negative plate or plates while in contact with the boric acid solution for a short period of time to anodic polarization.

CROSS-REFERENCES TO RELATED APPLICATIONS

The present application is a continuation-in-part of my copending application Ser. No. 630,170, filed Mar. 20, 1967, and entitled, "Lead Acid Storage Batteries and Method of Making the Same."

BACKGROUND OF THE INVENTION

As I described in my above-mentioned copending application, the plates or electrodes of a storage battery, and particularly of a lead-acid storage battery, may be impregnated with boric acid by being immersed in a solution of boric acid, or by being sprayed with a boric acid solution, or by being dusted therewith.

The present invention is particularly concerned with a method of impregnating the storage battery plates with boric acid after formation of the battery and washing of the formed plates, in the case of lead-acid storage batteries for the purpose of removal of free sulfuric acid, has been completed. The washing or watering of the electrode blocks in their housing is preferably facilitated by cathodic polarization.

Since the forming or formation of storage batteries is more and more carried out by moving belt methods, the shortening of the individual process steps, particularly those which up to now required long periods of time, becomes more and more important. These relatively long lasting process steps include primarily the watering of the storage battery plates after formation of the latter, which generally takes hours and which is required in order to remove as far as possible sulfuric acid from the formed plates of, for instance, a lead-acid storage battery.

According to other suggestions which are followed more and more, dry, storagable charged electrode plates are introduced into the housings of lead-acid batteries. In this connection, for instance, a method has been developed according to which the impregnated plates are immersed several times in boric acid solution and then dried, as well as a method according to which pulverulent boric acid is added to the active mass of the electrodes. The last-mentioned methods are described in more detail in my above-mentioned copending application. However, even these methods, although they are improvements over the earlier processes, require several process steps and thus are relatively expensive.

In order to reduce the prolonged periods of time required for the watering of the formed electrodes, i.e., for the removal of sulfuric acid, it has also been proposed to subject the electrode plates in the forming container or in the battery housing during watering to cathodic polarization. This method permits a substantial shortening of the period of time required for the watering of electrodes, i.e., for the removal of sulfuric acid therefrom and thus greatly facilitates moving belt operations.

However, it is still desirable to further reduce the time required for producing storage batteries, and particularly storage batteries containing boric acid in the electrodes, for the reasons discussed in more detail in my copending application and it is an object of the present invention to provide a method for further reducing the time of producing storage batteries and particularly lead-acid batteries which include boric acid in the electrodes.

The above-discussed prior art methods were utilized in combination by combining the cathodic polarization during the watering with immersion of the thus acid-free plates in a boric acid solution. However, to proceed in this manner is connected with difficulties, particularly if formation of the battery plates is carried out in battery containers, since the containers have to be repeatedly emptied and subsequently again filled with boric acid solution. These working steps are quite tedious and cause relatively high expenses for labor.

SUMMARY OF THE INVENTION

According to the present invention, storage battery plates and particularly the plates of lead-acid storage batteries are impregnated with boric acid by first forming the plates in a battery container, washing the formed plates with water for the purpose of removing free sulfuric acid, which washing preferably is carried out under cathodic polarization in order to shorten the washing period, introducing into the battery container which contains the formed substantially acid-free electrodes boric acid solution and subjecting the negative plate or plates in the battery container, in contact with the boric acid solution, to anodic polarization.

Preferably, the concentration of the boric acid solution will be between 1 and 11, or more preferably between 1 and 8% by weight of boric acid, and the boric acid solution may contain a relatively small proportion of sulfuric acid, which proportion should be sufficiently small so as not to substantially reduce the pH of the solution, or may contain small proportions of conductive salts, such as up to about 50 grams of such salts per liter of solution, which salts must be so chosen as not to have a deleterious effect on the batttery plates. In the case of lead-acid batteries, suitable, and, in fact preferred, salts include aluminum sulfate, sodium sulfate and magnesium sulfate. The sodium sulfate may also be replaced by other alkali metal sulfates.

DESCRIPTION OF THE PREFERRED EMBODIMENTS

The desired improvement is achieved according to the present invention by subjecting the battery plates, in the battery container in which the same were watered so as to remove excess acid therefrom, to contact with slightly acidified boric acid solution and then to enrich the boric acid content of the negative plate or plates by anodic polarization.

Thus, the method of the present invention requires after formation of the battery and removal of excess sulfuric acid by cathodic polarization, only the step of contacting the electrode plate blocks, comprising positive and negative electrodes as well as separators, with the boric acid solution and to subject the negative electrodes for a short period of time to anodic polarization. The anodic polarization of the negative electrode or electrodes greatly speeds up the impregnation of the same with boric acid.

The concentration of the aqueous boric acid solution preferably will be between 1 and 11% by weight of boric acid and generally between 1 and 8% by weight thereof.

According to preferred embodiments of the present invention, the conductivity of the boric acid solution is increased by incorporating therein conductive salts such as sodium sulfate or other alkali metal sulfates, aluminum sulfate or magnesium sulfate. It is also possible for this purpose to introduce acidic salts or small amounts of sulfuric acid into the boric acid solution.

The length of time for which anodic polarization of the negative plate or plates is to be carried out depends primarily on the current density.

Good results are achieved with current densities of the magnitude of between 1 to 4 times the current density which would be required in order to discharge the battery in 20 hours. With such current densities, the impregnation time, or the time for which anodic polarization of the negative electrode is to be carried out generally will be between about 5 and 15 minutes. By choosing the current density at which the anodic polarization is to be carried out, it must be considered that the plates should be evenly and in depth penetrated by the boric acid. The higher the current density, the greater the danger that only surface impregnation will take place.

It is a particular advantage of the method of the present invention that it does not require removal of the electrode blocks from the battery container in which formation of the electrodes and watering of the same has been carried out and that the various successive steps of the producing of the battery can be carried out in a continuous uninterrupted manner so that the total time required is relatively short and moving belt operations are facilitated.

In connection with impregnation of the negative plates with boric acid by contacting the negative plates with a slightly acidified boric acid solution and anodic polarization, it is important to note that the solubility of boric acid in water at 20° C. amounts to only 4.9%, however, that the solubility rises at 40° C. to 8.7% and at 60° C. to 11%. Optimum working temperatures for the impregnation of the plates of the storage battery with aqueous boric acid solutions have been found between 30° and 40° C., corresponding to a boric acid concentration of between 6 and 8% by weight.

The impregnation of relatively thin storage battery plates such as plates having a thickness of between about 1 and 2 mm., is not decisively affected by the current density. However, with increasing thickness of the plates, for instance between 2 and 5 mm., it is necessary to work at lower current densities. For instance, if plates having a thickness of 5 mm. are impregnated at high current densities of anodic polarization, a significant accumulattion of boric acid will take place in the outermost surface layer of the plates to such an extent that the impregnation of the interior portions of the plates will suffer. It is therefore suggested that the impregnation of relatively thick plates, for instance plates having a thickness of 5 mm., is carried out under anodic polarization with lesser current densities and, to compensate therefor, that the period of time of impregnation is somewhat prolonged. This will prevent more or less exclusive surface impregnation and achieve a uniform impregnation or a substantially uniform impregnattion throughout the entire cross section of the plates.

Conductive salts should be incorporated in the boric acid solution only in small proportions, for instance, between 10 and 20 grams of $Al_2(SO_4)_3$ per liter of solution.

The length of time of impregnation and thus of anodic oxidation, for instance in the case of a 44 ah. storage battery the plates of which have the following dimensions: 143 mm. x 106 mm. x 1.8 mm., and which contains four positive and five negative plates will take about 5 to 10 minutes at a current density which corresponds to the current density which will cause discharge of the battery within a period of between 5 and 20 hours. If the battery plates are of greater thickness, for instance 5 mm., it is advisable to prolong the time of impregnation and anodic polarization to between about 15 and 20 minutes and to reduce the current density to that corresponding to discharge of the battery within 20 hours or even a longer period of time.

The method of the present invention may be carried out in the following manner, without, however, limiting the invention, to the specific details described below.

EXAMPLE.—FORMING OF THE ELECTRODE BLOCK IN A BATTERY CONTAINER IN SULFURIC ACID HAVING A DENSITY OF 1.08

| | | |
|---|---|---|
| 16 h. | 10 a. | 160 ah. |
| 1 h. | Rest | |
| 3 h. | 8 a. | 24 ah. |
| 1 h. | Rest | |
| 3 h. | 5 a. | 15 ah. |
| 24 h. | | 199 ah. |

Removal of excess sulfuric acid by watering and cathodic polarization:

Minutes
Discharge at 5 a. _____ 3
Charge at 5 a. _____ 3
Discharge at 5 a. to 1 a. decreasing _____ 3
Charge at 5 a. to 1 a. decreasing _____ 3

The current is decreasing because the internal resistance and the resistance of the electrolyte increase during watering.

During the watering, at least 1 liter water flows through the battery cell. During the second discharge and charging, the current density is somewhat reduced due to the increased resistance of the no longer sulfuric acid-containing water.

Impregnation with boric acid solution

After dumping of the water from the battery container, the latter is filled with an aqueous solution of 8.7% boric acid and 10 grams aluminum sulfate per liter. The solution has a temperature of 40° C. The battery is then discharged for ten minutes at 2.5 a. Thereafter, the boric acid solution is dumped and the battery cell dried with hot air for 35 minutes. In certain cases, the impregnation with boric acid is then repeated, followed by a second hot air drying at a temperature of between 130° and 140° C.

Suitable compositions of the boric acid solution

It appears that the optimum concentration of the boric acid solution is between 6 and 7% by weight which corresponds to a substantially saturated solution at about 30° C.

If impregnation is to be carried out at lower temperatures, the boric acid concentration will be correspondingly lower, for instance at 20° C. about 4.9% by weight of boric acid will be dissolved and, on the other hand, at higher temperatures larger proportions of boric acid may be dissolved so that, for instance, a boric acid solution which is to be used at 40° C. may contain about 8.7% by weight boric acid.

Generally, the minimum concentration of boric acid should be 1% by weight and the maximum concentration about 11% by weight.

However, it has been found that the utilization of a boric acid solution containing between 7 and 8% by weight of boric acid will accomplish the desired protection of the negative plate against oxidation, so that an increase of the boric acid concentration in the boric acid solution to higher concentrations than about 8% by weight would have little advantage.

Since the pH of the boric acid solution is about 5.5, only small amounts of sulfuric acid should be admixed to the solution. The sulfuric acid concentration is so chosen that the pH will not rise above 5.5. Such small proportions of sulfuric acid will not interfere with the oxidation-impeding effect of the boric acid. Absolute removal of the entire sulfuric acid by watering and cathodic polarization so that the negative plates are absolutely free of sulfuric acid is practically impossible. Residual amounts of sulfuric acid, however, upon proper watering should not exceed 0.3% $H_2SO_4$ corresponding to a lead sulfate content of the plates of about 1%.

Conductive salts

It is not desirable to introduce into the boric acid solution relatively large proportions of conductive salts since the current conductivity should primarily be assured by the boric acid itself. It has been found advantageous to introduce into the boric acid solution between 10 and 20 grams of aluminum sulfate or at most up to 50 grams thereof per liter of solution and similar advantageous effects are achieved by substantially the same proportions of sodium sulfate.

Quite obviously, such additions of conductive salts have to be adjusted to the specific conditions prevailing in a given case. If the watering prior to the boric acid treatment leaves relatively large proportions of residual sulfuric acid in the battery plates, obviously no further addition of conductive salts should be made.

Generally, all salts are suitable as conductive salts which are relatively strongly dissociated in aqueous solution. However, all salts have to be excluded which might have a deleterious effect on the negative lead sponge or on the lead oxides of the positive electrode. Thus, for instance, copper sulfate or nickel sulfate are excluded since they would considerably increase the self-discharge of the battery. However, for instance, magnesium sulfate has a favorable effect similar to that of aluminum or sodium sulfate, and sodium sulfate may be replaced by other alkali metal sulfates. According to the above defined method the boric-acid contents of the negative electrodes is increased to protect them against oxidation. During the time in which the negative plates are polarized anodically, the positive electrodes are also immersed in the boric-acid solution and are thus also impregnated with boric-acid. The impregnation of the positive plates pretects them against taking up of atmospheric $CO_2$. As during storage the negative electrodes will more easily be oxidized than the positive electrodes will take up atmospheric $CO_2$ it is of special importance to protect the negative electrodes. This better protection of the negative electrodes is achieved by the method according to the invention, because by anodically polarizing the negative electrode more boric acid is incorporated in these electrodes than in the positive electrodes.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A method of impregnating storage battery plates for lead-acid accumulators with boric acid, comprising the steps of inserting the unformed positive and negative electrode plates and the separators in a battery container, forming the electrode plates; watering the electrode plates; thereafter contacting the formed electrodes in said battery container with boric acid solution and subjecting the negative plates to anodic polarization.

2. A method as defined in claim 1, wherein the electrodes of said storage battery are watered by cathodic polarization until substantially free of acid after being formed and prior to being contacted with boric acid solution.

3. A method as defined in claim 2, wherein said boric acid solution contains between 1 and 11% by weight of boric acid.

4. A method as defined in claim 2, wherein said boric acid solution contains between 1 and 8% by weight of boric acid.

5. A method as defined in claim 3, wherein said boric acid solution contains a minor proportion of sulfuric acid.

6. A method as defined in claim 5, wherein said sulfuric acid-containing aqueous boric acid solution has a pH of less than 5.5.

7. A method as defined in claim 3, wherein said boric acid solution contains a minor proportion of at least one conductive salt.

8. A method as defined in claim 7, wherein said boric acid solution contains per liter between 10 and 50 grams of conductive salt.

9. A method as defined in claim 8, wherein said conductive salt is selected from the group consisting of aluminum, magnesium, and alkali metal sulfates.

10. A method as defined in claim 7, wherein anodic polarization of said negative plate is carried out for a period of between about 5 and 15 minutes at a current density corresponding to between about 1 to 4 times the current density required for charging the battery in a period of 20 hours.

References Cited

UNITED STATES PATENTS

| | | | |
|---|---|---|---|
| 458,425 | 8/1891 | Lugo | 136—26 |
| 2,996,563 | 8/1961 | Haebler | 136—27 |

WINSTON A. DOUGLAS, *Primary Examiner.*

C. F. LE FEVOUR, *Assistant Examiner.*

U.S. Cl. X.R.

136—120